United States Patent
Nakhjiri

(10) Patent No.: US 9,219,607 B2
(45) Date of Patent: Dec. 22, 2015

(54) PROVISIONING SENSITIVE DATA INTO THIRD PARTY

(71) Applicant: General Instrument Corporation, Horsham, PA (US)

(72) Inventor: Madjid F. Nakhjiri, San Diego, CA (US)

(73) Assignee: ARRIS Technology, Inc., Suwanee, GA (US)

( * ) Notice: Subject to any disclaimer, the term of this patent is extended or adjusted under 35 U.S.C. 154(b) by 0 days.

(21) Appl. No.: 14/132,295

(22) Filed: Dec. 18, 2013

(65) Prior Publication Data

US 2014/0281493 A1     Sep. 18, 2014

Related U.S. Application Data

(60) Provisional application No. 61/785,673, filed on Mar. 14, 2013.

(51) Int. Cl.
| | | |
|---|---|---|
| H04L 9/32 | (2006.01) | |
| H04L 9/00 | (2006.01) | |
| G06F 21/10 | (2013.01) | |
| G06F 21/33 | (2013.01) | |

(52) U.S. Cl.
CPC ............... H04L 9/321 (2013.01); G06F 21/10 (2013.01); G06F 21/33 (2013.01); H04L 9/006 (2013.01)

(58) Field of Classification Search
CPC ... G06F 21/10; G06F 21/33; H04L 2463/101; H04L 63/10; H04L 63/0823; H04L 9/31; H04L 9/006; H04L 9/321
See application file for complete search history.

(56) References Cited

U.S. PATENT DOCUMENTS

| | | | | |
|---|---|---|---|---|
| 6,088,805 | A * | 7/2000 | Davis | G06F 21/33 726/10 |
| 7,412,524 | B1 * | 8/2008 | Gupta et al. | 709/229 |
| 8,452,961 | B2 * | 5/2013 | Song et al. | 713/170 |
| 2002/0019943 | A1 * | 2/2002 | Cho et al. | 713/200 |
| 2004/0078581 | A1 | 4/2004 | Dublish et al. | |
| 2005/0273399 | A1 * | 12/2005 | Soma et al. | 705/26 |
| 2007/0124602 | A1 * | 5/2007 | Wald et al. | 713/193 |
| 2008/0256358 | A1 * | 10/2008 | Wilkie | G06F 21/33 713/156 |
| 2009/0169019 | A1 * | 7/2009 | Bauchot | G06F 21/10 380/278 |
| 2010/0088507 | A1 * | 4/2010 | Cho | G06F 21/33 713/156 |
| 2011/0296171 | A1 * | 12/2011 | Fu et al. | 713/156 |
| 2012/0131343 | A1 * | 5/2012 | Choi et al. | 713/168 |

(Continued)

OTHER PUBLICATIONS

PCT Search Report & Written Opinion, Re: Application #PCT/US2014/019723, dated May 19, 2014.

*Primary Examiner* — Catherine Thiaw
(74) *Attorney, Agent, or Firm* — Thomas A. Ward

(57) ABSTRACT

A method for providing identity data to network-enabled devices includes receiving a request for identity data from a network-enabled device that is deployed to an end-user. The network-enabled device is pre-provisioned with a PIN, a global key pair, a user-accessible first device identifier, and a second device identifier usable by a service provider delivering a service to the device. The identity data request includes the first and second identifiers, a protected rendition of the PIN, and an encryption key or other data from which an encryption key is derivable. The identifiers, the protected rendition of the PIN, and the encryption key or the other data are signed by a private key in the global key pair. The validity of the PIN included in the request is verified to authenticate the device. If the PIN is valid, identity data for the device is generated, encrypted and sent to the network-enabled device.

12 Claims, 5 Drawing Sheets

(56) References Cited

U.S. PATENT DOCUMENTS

| | | | |
|---|---|---|---|
| 2012/0173873 A1* | 7/2012 | Bell et al. | 713/156 |
| 2012/0216035 A1* | 8/2012 | Leggette | G06F 3/0614 713/157 |
| 2012/0239934 A1* | 9/2012 | Trench | G06Q 20/02 713/173 |
| 2012/0260330 A1* | 10/2012 | Zlatarev | G06F 21/33 726/10 |
| 2012/0303951 A1 | 11/2012 | Medvinsky et al. | |
| 2012/0311686 A1* | 12/2012 | Medina | H04L 63/0807 726/7 |
| 2013/0047254 A1 | 2/2013 | Radharkrishnan et al. | |
| 2013/0117560 A1* | 5/2013 | Resch | H04L 63/0823 713/157 |
| 2013/0132721 A1* | 5/2013 | Busser et al. | 713/168 |
| 2013/0152180 A1* | 6/2013 | Nair et al. | 726/6 |
| 2013/0174271 A1* | 7/2013 | Handal et al. | 726/27 |
| 2013/0191928 A1* | 7/2013 | Yin et al. | 726/27 |
| 2013/0218779 A1* | 8/2013 | Kirillin et al. | 705/72 |
| 2013/0227594 A1* | 8/2013 | Boone | G06Q 20/20 725/5 |
| 2013/0232336 A1* | 9/2013 | Cheung et al. | 713/156 |
| 2013/0254116 A1* | 9/2013 | Hayhow et al. | 705/71 |
| 2014/0013106 A1* | 1/2014 | Redpath | H04L 63/0428 713/156 |
| 2014/0052993 A1* | 2/2014 | Isozaki | H04L 63/0428 713/175 |
| 2014/0149741 A1* | 5/2014 | Balakrishnan | G06F 21/335 713/159 |
| 2014/0181504 A1* | 6/2014 | Almahallawy et al. | 713/156 |
| 2015/0249540 A1* | 9/2015 | Khalil | H04L 9/3263 713/158 |

* cited by examiner

PROVISIONING SENSITIVE DATA INTO THIRD PARTY

BACKGROUND

Security and privacy represent important issues in modern communication when network-enabled devices such as mobile phones, personal computers, routers, set-top boxes and the like communicate over fixed or wireless networks. There are a number of scenarios where a network-enabled device is to be provisioned with sensitive material from a remote provisioning server in order to enhance security and privacy. Illustrative examples of such a provisioning server includes a Certificate Authority (CA), a conditional access (CAS) or Digital Rights Management (DRM) registration server and an Identity/licensing server.

A Certificate Authority (CA) issues digital certificates which can be used as an attestation by the CA of the authentication of certificate holder. The CA sends the certificate, along with a public/private key pair, to the network-enabled device for use in other security procedures. The CA may also be a renewal system that allows the device to obtain a new identity based on presentation of an old identity.

A conditional access (CAS) or Digital Rights Management (DRM) registration server, which registers a device so that it can receive valuable content (e.g., video, audio, documents, etc), sends sensitive key material to the device to be used in conjunction with CAS or DRM protocols and procedures to access the valuable content. A CAS or DRM registration server can also be viewed as a renewal system, because it needs to perform a strong authentication of the device identity and its credentials before registering the device.

An identity/licensing server, operating in conjunction with an application service (e.g. a picture/file sharing service, a cloud service, a home security system, a health-record system, etc), sends the network-enabled device a set of credentials for subsequent use to access one or more services provided by the application. The identity server needs to authenticate the device before registering for service and providing it with access credentials/licenses.

DETAILED DESCRIPTION

The method, techniques and systems shown herein are applicable whenever a set of data needs to be delivered from one party to another with a guarantee of privacy, authenticity and integrity. For purposes of illustration only and with no loss of generally, the methods, techniques and systems described herein will be applied to identity data of the type that is generated by a Certificate Authority, a conditional access or digital rights management registration server or an identity/licensing server. Identity data as used herein refers to any credentials or other data that is to be provisioned in network-enabled devices by any of these systems. For example, identity data may refer to a private and public digital key pair and a digital certificate associated therewith. For purposes of illustration these various systems will be referred to generally as a provisioning system that is used to upgrade, renew, supplement or otherwise provision identity data in network-enabled device. Such a system is typically used, for instance, to extend the life of network-enabled devices which have already been deployed to end users so that they can be used beyond their initially authorized service periods or used to receive services that were not provisioned at the time of their manufacture. Network-enabled devices may include, without limitation, mobile phones, smart phones, personal computers ("PCs"), notebooks, tablets, set-top boxes, routers, media centers and so on.

Figure 1:
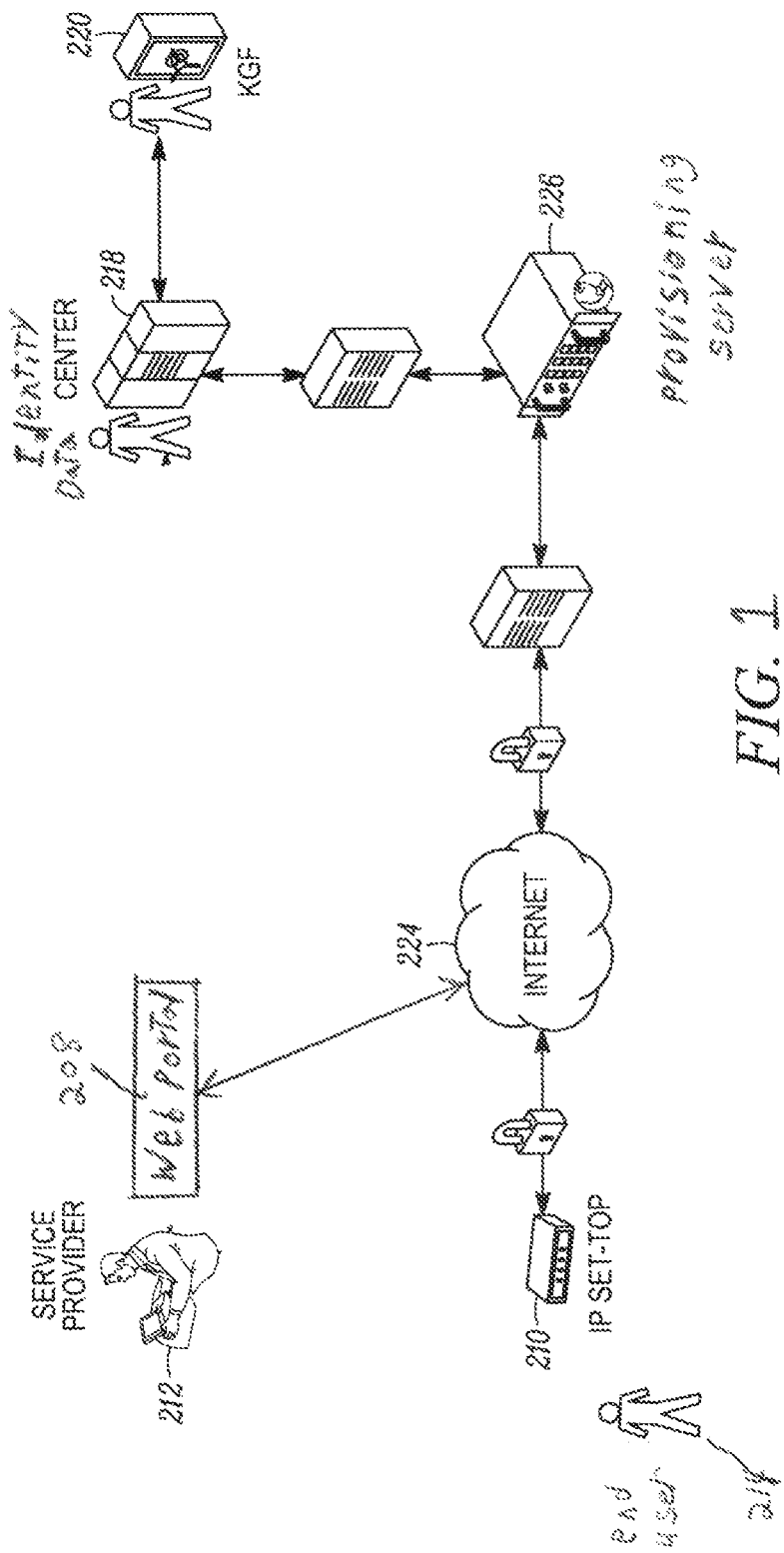
FIG. 1 shows one example of an operating environment in which the processes described herein for provisioning network-enabled devices with identity data may be implemented.

FIG. 1 shows one example of an operating environment in which the processes described herein for provisioning network-enabled devices with identity data may be implemented. In this example the network-enabled device is a set top box 210 which is operated by a service provider 212. The set top box is deployed in the field to an end user customer 214. The end user customer 214 can communicate with the service provider 212 over the Internet 224 or any other packet-based wide area network. In this example the end user customer 214 interacts with the service provider 212 through one or more web portals 208, which provide a single front-end interface that is accessed by a client-based application such as a conventional web browser.

The operating environment shown in FIG. 1 also includes an identity data center 218, which oversees the identity data process and controls and maintains the identity data that is generated. The identity data center 218 obtains identity data from an identity data generator 220, which generates the identity data for the network-enabled devices. If, for instance, the identity data includes a public and private key pair, the identity data generator 220 may be referred to as a key generation facility (KGF). The identity data generator 220 may be an online or offline facility. After the identity data center 218 obtains identity data records from the identity data generator 220 it loads them onto an on-line provisioning server 226. The on-line provisioning server 226 is accessible to the network-enabled devices that are to be provisioned with the identity data over the Internet 224.

In one common scenario, when the end user 214 of network-enabled device 210 wishes to obtain new identity data it sends a request to the provisioning server 226. As part of the request the device provides its current identity and a credential for authentication to the provisioning server 226. Once the device is authenticated, it receives a protected package (e.g., an encrypted package) that includes a set of credentials, along with a new identity. In the most straightforward case the device's prior credentials (which were used to initially authenticate the device) are unique and trusted by the provisioning server 226.

For example, when the provisioning server 226 is a CA and the credentials presented by the device are a public/private key pair and a certificate that have previously been issued by the same CA, the network-enabled device can sign its credential renewal request using the private key corresponding to the certificate. The provisioning server 226 verifies the signature using the device certificate, creates new identity data and a new certificate and, after recording the renewal, encrypts the renewed material with the public key corresponding to the device certificate that was used in the request. The device decrypts the new material with its private key and loads into its memory.

A more complicated, but commonly occurring scenario arises when the device is pre-provisioned with credentials which are un-trusted, un-recognizable or non-existent. Such a situation can occur for a variety of reasons. For example, the pre-provisioned credentials may not have been issued by the same CA which is providing the new credentials or they may have been issued by a CA that has no trust relationship with the provisioning server which is issuing the new credentials. Either way, from the standpoint of the provisioning server, the current device credentials are not trusted. This situation may occur, for example, when the provisioning server is dealing with a device manufactured or provisioned by a third party. As a concrete example, a DRM vendor B may be attempting to provision mobile devices from manufacturer A with DRM keys/certificates for use in system B. In such a case the provisioning server needs to replace the device's existing identity data with new identity data that is usable with the new service.

In another scenario, pre-provisioned credentials from manufacturer A may only accessible through a set of secure Application Programming Interfaces (APIs) that cannot be used by vendor B. As a consequence, even though the device has a set of credentials that are stored in a secure storage, the lack of authorized access to the secure area essentially makes the pre-provisioned credentials initially provided by the manufacturer A unusable by any third parties. For such third party devices, not only may key pairs be inaccessible, but secured hardware IDs also may be inaccessible. Even though a device unique hardware ID (HUID) could be provided to vendor B through an out-of-band mechanism (contracts, etc), the lack of access to the HUID through a secure API means that the HUID would have to be coded into the software (e.g. inserted by vendor B as part of its client software development toolkit). However, this approach does not provide strong protection against tampering with the HUID and thus the authentication to vendor B may be questionable.

In yet another scenario, a blacklisting or other blocking (e.g., access control) policy by the operator deploying the network-enabled device may prevent a provisioning server from using or trusting the pre-provisioned credentials. That is, the device may be already deployed in the field, but its identity is not on a white list of device identities which are eligible or authorized for renewal or use in the operator's system. In such a case, if the device identity data is to be renewed, and if the device uses its prior credentials for authenticating the renewal request, the provisioning server will reject the request simply for policy reasons.

Regardless of the actual scenario and the reason for the lack of trust in the existing credentials, the identity data provisioning systems described earlier essentially all require two main security measures. First, the network-enabled device needs be authorized to obtain the identity data. The lack of a device unique key (e.g. the private key) means that a private key based digital signature cannot be used to authenticate the renewal request for identity data. Second, the new identity data needs to be delivered in a secure manner. Without access to a device unique public/private key pair, the delivery of the identity data from the provisioning server to the network-enabled device becomes more difficult and less secure.

In one conventional approach this problem is addressed by installing a global key in the device (using, for instance, a software obfuscation mechanism) to allow encryption of identity data for secure delivery. All network-enabled devices within a given population (e.g., a product line or model) will have the same global key pair. The network-enabled device uses this global key pair to interact with the provisioning server, e.g., to authenticate the device's renewal request. The provisioning system has a copy of the global certificate and can thus authenticate the device. One problem with the use of a global key, however, is that it cannot provide protection against cloning. Accordingly, the provisioning server needs to use other means to avoid cloning. For instance, the request may include the current, unique device ID, which is signed by the device. Other fields may also be used in the request such as time stamps and a nonce. In such a case the provisioning server can check the device ID against its own white list to ensure that it has not previously received any requests from the same device (as part of a cloning attack).

The provisioning server may then use two layers of encryption to deliver the new identity data to the network-enabled device. The inner end-to-end encryption layer is performed by the backend identity data generator 220 shown in FIG. 1. After generating the device unique identity data, the identity data is encrypted with the global public key before passing the data to the online provisioning server 226. The encryption key that is used could be based, for example, on a Diffie Hellman (DH) exchange with the network-enabled device to obtain an AES key. Both the provisioning server and the network-enabled device can use randomly generated ephemeral DH public keys. However, when the network-enabled device is a third party device, this DH is considered semi-anonymous, since, although the device signs the message carrying its DH public keys, the signature is performed using its global private key/certificate, thus providing no cryptographic assertion of the device's unique identity.

In order to provide enhanced protection against cloning as well as Denial of Service (DOS) attacks, the provisioning server needs to be able to uniquely identify the network-enabled device prior to establishment of the outer layer encryption key. Better yet, there should be ways to uniquely encrypt the identity data even at the inner layer. A device-unique key inner layer encryption could potentially be considered secure enough to skip the DH based outer layer encryption all together.

In some implementations, the aforementioned problems can be addressed to provide a more robust protection mechanism than can be achieved with the sole use of global keys by including additional authentication factors such as activation codes, PINs, one time passwords (OTPs), and the like. For simplicity these authentication factors will be collectively referred to as a PIN. It should be noted that the same PIN can be provided for either one time use (similar to a nonce) or multiple use with the same provisioning server.

The PIN(s) can be used to establish trust between the network-enabled device and the provisioning server, specifically for request authentications, entity authentication and/or encryption key establishment. In cases where the device uses a DH key exchange protocol to establish an encryption key with the provisioning server to encrypt the identity data when it is sent from the provisioning server to the network-enabled device, the PIN and a global key can be used for authentication of the DH from the device side.

PIN Delivery

The PIN can be delivered to the network-enabled device in a variety of different ways. For instance, the PIN can be delivered as part of an interactive delivery process, a mass delivery process or a proactive delivery process. Each of these illustrative processes will be discussed in turn.

An interactive delivery process may be suitable for a retail model in which a consumer purchases its network-enabled device (a third party device) through retail channels without having any prior relationship with a service provider/operator. The consumer decides to use a specific service provider and register with the service provider through the web portal 208 shown in FIG. 1. The registration process between the web portal 208 and the network-enabled device is shown in the message flow diagram of FIG. 2. At 1, the end user enters a user name/password to log in to the web portal using a client application, which may or may not reside on the network-enabled device. This interaction is typically protected by a one-way secure-sockets layer (SSL) protocol, using the web portal SSL certificate to authenticate the web portal to the device/end-user. The end user also sends the current device ID (referred to herein as ID_A). The end user may enter the current device ID manually. Alternatively, interactive user interface (UI) features of the client application may be employed which allow the network-enabled device to register its device ID automatically without user intervention. The current device ID, ID_A, may be, for instance a serial number, tag or something else accessible to the user or to the device.

When registration is complete, the web portal generates one or more PINs at 2. The PIN, which is delivered to the network-enabled device at 3, may be protected through the SSL protocol or whatever other security mechanism is provided by the service provider. For instance, in some implementations the PIN may be delivered by mail, e-mail, a text message to a cellular phone, and so on. Some of these methods may require additional user interaction (e.g., entering the PIN into the network-enabled device) and some may not. Either way, the end result is that the device has access to the PIN provided by the web portal, which can be used by the device for subsequent authentications to one or more provisioning servers. As further indicated at 4 in FIG. 2, this scenario requires the web portal to subsequently send the PIN(s) to the provisioning server through a back-end channel so that the provisioning server can verify the PIN when it is supplied by the device during, for example, a renewal request authentication.

A mass delivery process is a more scalable alternative that is suitable in subsidized models, i.e. models where the consumer chooses a device after having chosen the service provider/operator, who often provides economic incentives to the consumer such as subsidizing device costs. In such cases, the service provider enrolls a large number of devices into its database, issuing them device IDs suitable for operation with their network. The service provider could also outsource the device ID issuance to the provisioning system. The device IDs are typically allocated for a range of available identities and are generated in bulk so that they can be installed individually within each device at a field office. As part of the device ID provisioning process, a secret PIN also may be loaded into the device and stored in a secure manner for later use. The new device ID that is provided may be referred to as ID_B, since it is the identifier which is usable by the service provider after the identity data provisioning process is complete. That is, the provisioning server uses the PIN to assert device authentication and bind the device identifier ID_B to the new identity data that is provided to the device.

A proactive delivery process may be considered as the opposite of the interactive delivery process described above in the sense that the PIN is created by the provisioning server and used for authentication to the web portal. The business model is similar to that in a mass delivery process, as it assumes the device is obtained through subsidized channels. The provisioning server generates the PIN, which is installed within each subsidized device prior to delivery to the end user. Alternatively, the PIN may be provided to the end user as part of the service sign-up process or when delivering the device package to the user. The RS server would then record a mapping of the generated PIN to the device ID. This is possible the device ID is already known at the server or generated by the target server. The advantage of this method is that the backend exchange of PINs between web portal and the server and the offloading of the PIN creation from web portal. The device would later use the PIN to authenticate with the portal when registering for service.

Figure 2:
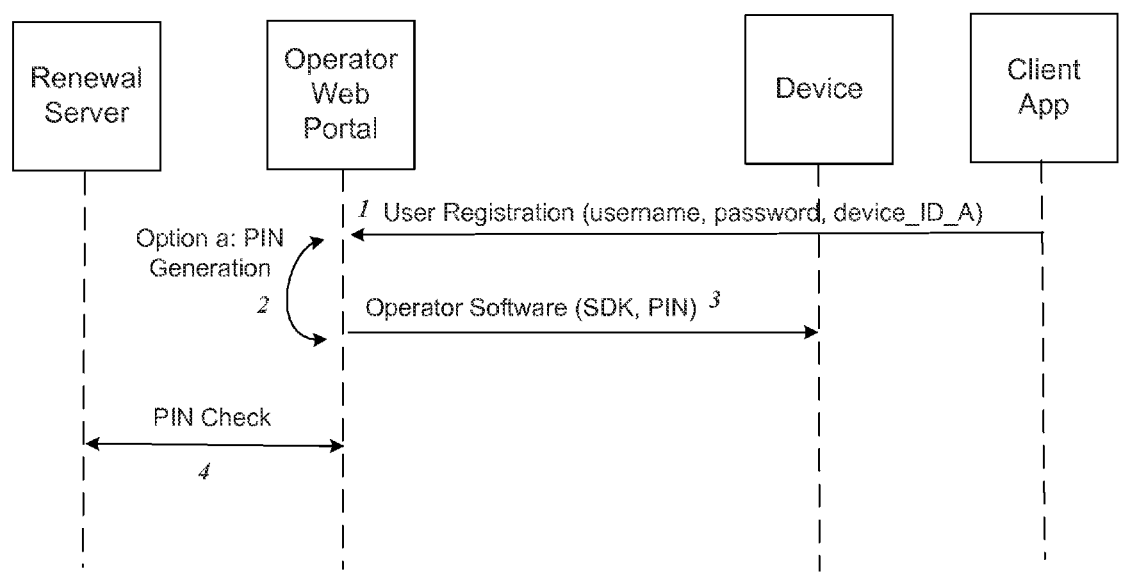
FIG. 2 is a message flow diagram illustrating one example of the registration process between the web portal and a network-enabled device.

As indicated at 3 in FIG. 2, the web portal may also provide a software development toolkit (SDK) for the provisioning of the device for operation within the service provider's network. The SDK may, for instance, carry DRM clients for the device so that it is able to receive DRM-protected content. Among other things, the SDK may carry a global key for the device and a certificate chain for the provisioning server.

It should be noted that the use of a PIN requires coordination between the party generating the PIN (e.g. the service provider web portal) and the party using it for authenticating the device (e.g. the provisioning server). In some scenarios the web portal issuing the PIN may be the verification server. In that case the web portal simply calculates the hash and records the value for later use. A database of these hashes is created based on a white list of device IDs and possibly a subscriber_ID, indicating that the subscriber and the device have already registered for future service authorizations.

It should also be noted that the device identifier ID_A reported to the web portal is an identity that is available to the user, and may be different from the device identifier ID_B, which will be used in connection with the new identity data (e.g., the digital certificate) being provisioned. The two identifiers may be different for any of several reasons. For instance, the device identifier ID_B simply may not be accessible to the user. Alternatively, the device identifier ID_B may be assigned by the service provider web portal as a part of the registration process. This way each different service (e.g. video streaming, DRM, etc) is able to issue new identities to the device. The device would then, through the renewal process, present this device identifier to the provisioning server and have a certificate issued for the device identifier ID_B assigned by the service provider.

In yet another alternative, the device identifier ID_B may be assigned by the provisioning server issuing the certificates. In such a case, the provisioning server can simply issue a large batch of credentials (e.g., ID_B, PIN, key pair, certificates). The provisioning server can then send a batch of device identifier/PIN pairs (e.g., ID_B, PIN) or (ID_B, encrypted (PIN) to the service provider web portal. The encryption key could be, for instance, a global key used for the entire device population to safeguard the PIN from the web portal. As users register their devices, the web portal can deliver the device identifier/PIN pairs to the respective network-enabled devices. Each device builds its identity data renewal request using the device identifier ID_B that has been assigned and the PIN that is delivered.

Identity Data Provisioning Process

Figure 3:
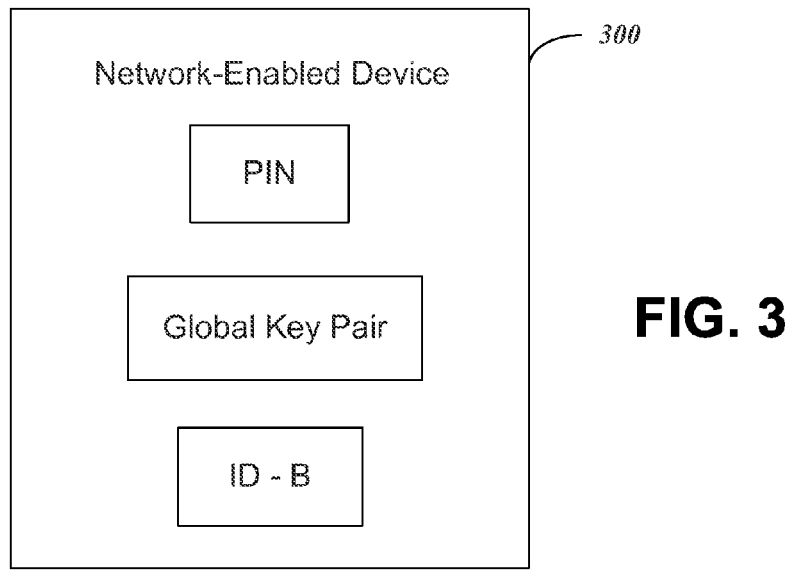
FIG. 3 shows the items in the possession of a network-enabled device when it sends an identity data request to the provisioning server.

As shown in FIG. 3, when a network-enabled device 300 sends an identity data request to the provisioning server, it is assumed to be in possession of a PIN, a global key pair (possibly obfuscated into software) and a device identifier ID_B. The PIN may be obtained through the service provider web portal or by other means, such as those described above. The device identifier ID_B is used after identity data provisioning process is complete. For instance, when a new certificate is issued by the provisioning server, the device identifier ID_B can be included in the new certificate (N_Cert). When a certificate is not used, the package of identity data delivered to the device may include other measures to ensure that the device identifier ID_B is only usable by this device. The device identifier ID_B may or may not be the same as the device identifier ID_A. If they are not the same, then both identifiers should be included in the signed portion of the request.

Figure 4:
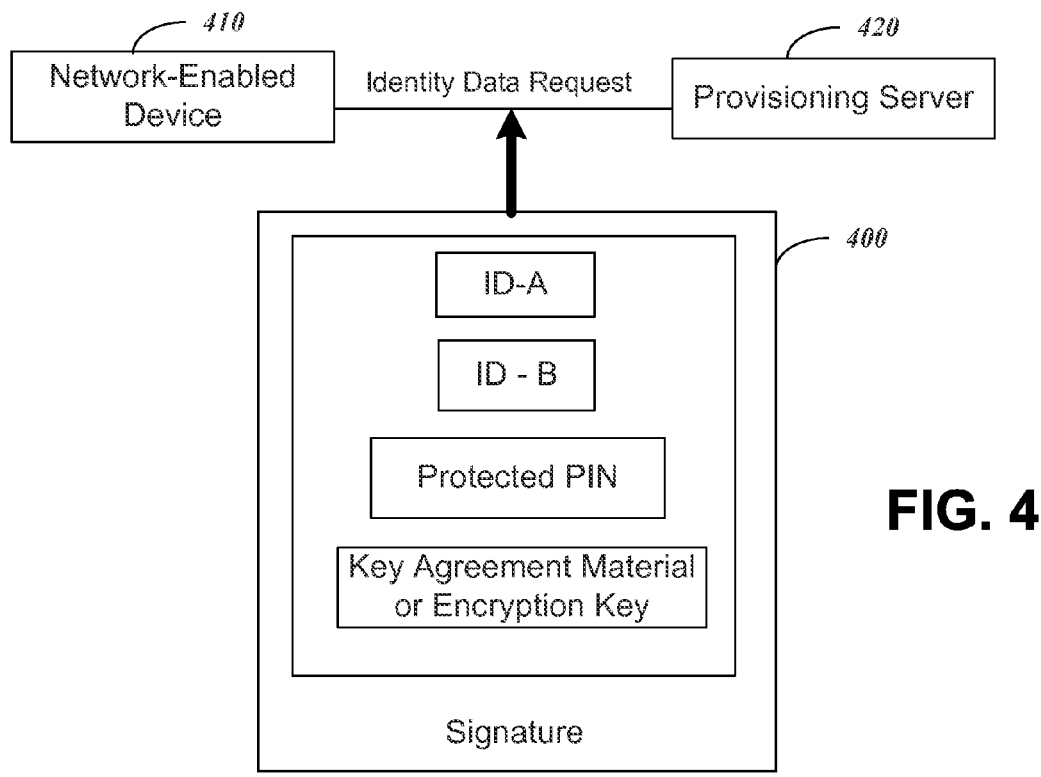
FIG. 4 shows one example of the parameters that may be included in the identity data request from a network-enabled device to a provisioning server.

As shown in FIG. 4, the identity data request 400 from network-enabled device 410 to provisioning server 420 includes the following parameters:

- Device identifier ID_B: the identity to be included in the new certificate, if available (e.g. if extracted from the device or delivered by the web portal).
- Device identifier ID_A: the identity that was used as part of exchange (user registration) delivering the PIN.
- Protected PIN: The protection can achieved using, for example, a hash function or encryption.
- Any optional key agreement material. For instance if a Diffie-Hellman exchange is used to arrive at a symmetric key for additional protection of identity data, the device may create a temporary DH key pair and include the DH public key as part of the request. It should be noted that a DH exchange requires some form of authentication, which may be provided through a combination of the PIN and the device's global public key, as described below.
- An optional encryption key: if a DH exchange is not employed, the request may include a renewal encryption key (REK). The key would be included in the request (in encrypted form) as described below
- A signature: The signature may be provided using the global key pair delivered to the network-enabled device. The public key must be known by the provisioning server so that the server can verify the signature. The signature will cover at least the identities, the protected PIN and any key material provided in the request.

Protection of PIN in Identity Data Request

As mentioned above, when the PIN is sent by the network-enabled device to the provisioning server it may be protected using a hash function or through encryption. Each of these alternatives will be discussed in turn.

An example of a hashed rendition of the PIN is as follows:

$$HPIN=hash(PIN,device\_ID\_B,[device\_ID\_A],[subscriber\_ID],[nonce]) \quad (Eq. 1)$$

$$SHPIN=Signature(sign\_key,HPIN) \quad (eq: 2)$$

Where [ ] denotes optional fields and the sign_key may be the device's global private key.

The hash may be a cryptographically secure hash function such as SHA256. The nonce is optional, but may be provided in case additional anti-replay measures are needed. The downside is that the nonce needs to be delivered to the party that verifies the hash. It is possible to simply send the hash result (H) to any party performing the verification.

When a user receives the PIN from a web portal during the registration process for service, the web portal could send the PIN directly through an SSL channel. In such a case, the burden of protecting the PIN when communicating with the provisioning server is on the device, in which case the device could create the HPIN as described above and may or may not use the sign_key to create a key hashed version of the PIN.

Alternatively, if the web portal sends the HPIN to the network-enabled device, the device would not have to calculate the HPIN. The device could simply pass the HPIN to the provisioning server. The provisioning server would later contact the web portal for HPIN verification.

To avoid the need for real time interaction between the provisioning server and the web portal in order to verify the HPIN, the SHPIN (Eq. 2) may be sent instead, where all the fields included in the HPIN are sent in the clear along with the signature. In this way the provisioning server can perform signature verification using the web portal signature. If this option is employed, the web portal private key bears a significant portion of the security burden.

If the PIN is protected through encryption, the encryption key that is employed may be the public key of the provisioning server. This public key (RS_PLK) may be installed as part of a trust list download (including, for instance, a certificate chain) within the device prior to its deployment. Alternatively, the public key (RS_PLK) may be delivered by the web portal during the registration process, in which case it can be included in the SDK. Given that the PIN provides an authentication factor, it may also be used to provide additional security when the identity data is sent to the network-enabled device. To accomplish this, in addition to the PIN, the device can also send a renewal encryption key (REK) to the provisional server as follows:

$$PPIN=RS\_PLK(PIN,REK)$$

The provisioning server can then use the REK to encrypt identity data material. In cases where the PIN had been generated by the provisioning server and delivered to the device using the global public key, the return of the PIN back to server effectively proves to the server that the device is in possession of the global private key. Thus, although the strength of device authentication is only increased by the entropy of the user password (via registration through the web portal), the entropy in encryption of the renewal material is strengthened by the strength of public key and the REK combined. Provided that the REK is stronger than the global public key, the identity data will be better protected.

Authentication of Deffie-Hellman Key Exchange Protocol Using PIN

When the network-enabled device has access to a clear or hashed PIN, it can use the PIN for authentication of the DH key exchange protocol that is performed with the provisioning server. In this case the device can transmit the following:

$$HPIN=hash(PIN,device\_ID\_B,[device\_ID\_A],[subscriber\_ID],[nonce]) \quad (Eq. 3)$$

$$SHPIN\ device=Signature(sign\_key,Device\_DH\_key,HPIN) \quad (eq: 4)$$

where the sign_key may be the device's global private key. If the PIN is provided by a party other than the web portal, the provisioning server needs to consult the web portal to receive the PIN and calculate the hash.

If the device has received HPIN from the web portal, then the device plugs it directly into eq 4 above. When the device has access to a hashed/signed version of the PIN (e.g., SHPIN from Eq. 2 above), it can use the SHPIN as follows:

$$SHPIN\ device=Signature(sign\_key,Device\_DH\_key,SHPIN) \quad (eq: 5)$$

Once again, the provisioning server needs to consult the party generating SHPIN for verification.

Handling of Identity Data Request by Provisioning Server

The identity data request can be handled by the provisioning server in a number of different ways. Two illustrative examples will be presented below.

Figure 5:
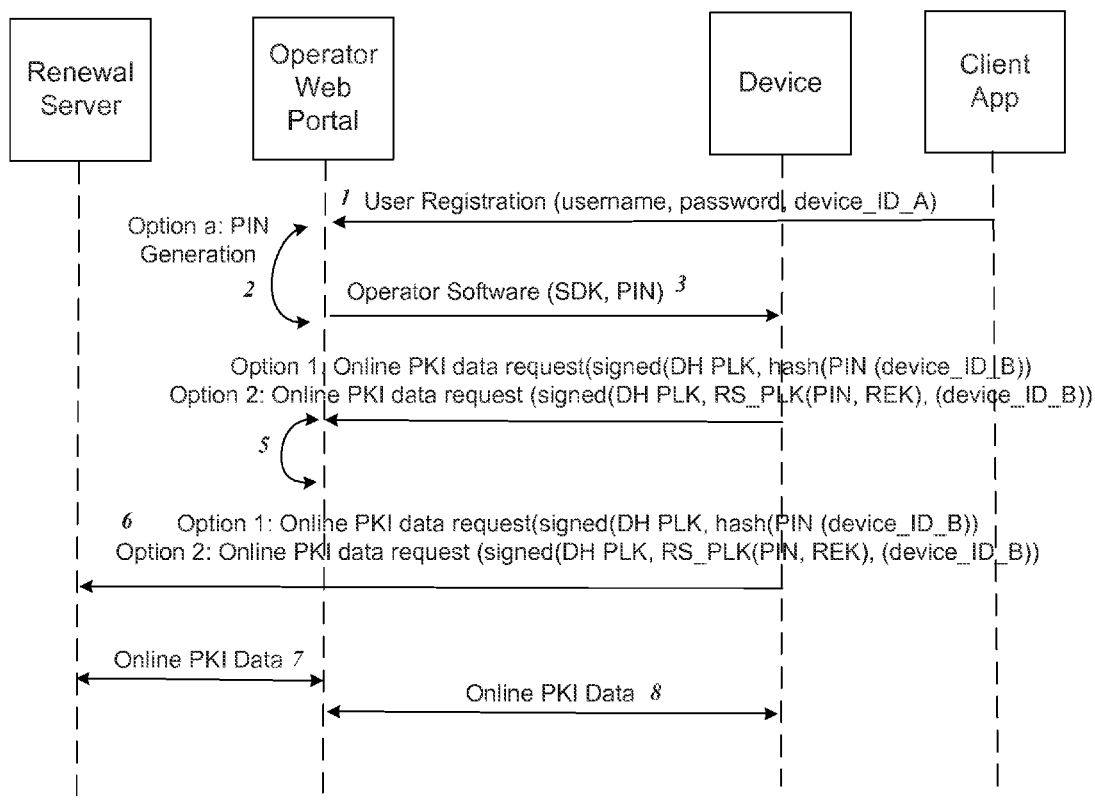
FIG. 5 is a message flow diagram illustrating one example of a method by which a network-enabled device obtains identity data.

In one example, the identity data request may be sent by the network-enabled device to the service provider web portal, which forwards it on the provisioning server. This example is illustrated in connection with the message flow diagram of FIG. 5. Messages 1 and 2, which respectively show the client application requesting a PIN from the web portal and the web portal generating the PIN, corresponds to messages 1 and 2 shown in FIG. 2. Next, at 3 the web portal sends the PIN to the network-enabled device. At 4 the client application residing on the network-enabled device sends the identity data request to the service provider web portal. Since the web portal generated the PIN, in this case it is possible for the web portal to validate the PIN locally before forwarding the request to provisioning server. Checking the PIN at the web portal is of course not possible if the PIN is encrypted with the provisioning server's public key. Accordingly, if the PIN is to be verified by the web portal a hash protection method similar to that defined in Eq 1 should be used, unless the link with the web portal is protected through other means such as SSL. FIG. 5 shows the web portal verifying the hash of the PIN at 5. After the web portal checks the validity of the PIN, at 6 it can forward the request to the provisioning server along with an indication that the PIN has been verified. In response, the provisioning server sends the requested identity data to the web portal at 7, which in turn sends it to the network-enabled device at 8.

In another example, the identity data request may be sent by the network-enabled device directly to the provisional server instead of the web portal. In this case the PIN could either be encrypted or hashed. If the PIN was created by the web portal and not the provisioning server, the PIN may come from the web portal either as is or in a hashed format. When the PIN is provided by the web portal and the identity data request is sent directly to the provisioning server, there needs to be a mechanism by which the web portal and provisioning server coordinate the verification of the PIN, which requires close interaction between the web portal and server. Since the network-enabled device is sending the request directly to the provisioning server, the device needs to be provided with the provisioning server address ahead of time, possibly, for example, by including it in the SDK downloaded by the device from the web portal during the registration process. Furthermore, the web portal firewall needs to allow communications on the ports and IP address being used by the provisioning server.

Figure 6:
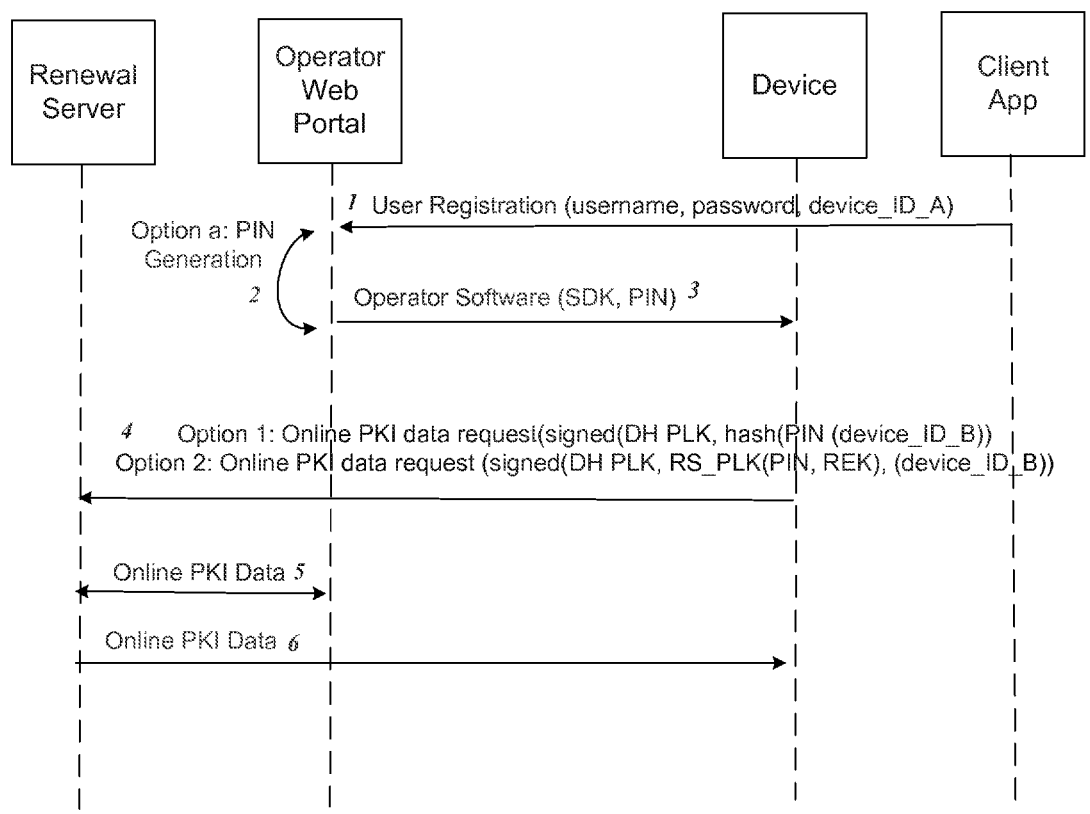
FIG. 6 is a message flow diagram illustrating an alternative example of a method by which a network-enabled device obtains identity data.

FIG. 6 is a message flow diagram of the aforementioned situation in which the identity data request is sent directly to the provisioning server by the network-enabled device. Messages 1 and 2, which respectively show the client application requesting a PIN from the web portal and the web portal generating the PIN, once again correspond to messages 1 and 2 shown in FIG. 2. At 3, the web portal sends the PIN and the SDK to the network-enabled device. Next, at 4 the network-enabled device sends the identity data request to the provisioning server. The provisioning server communicates with the web portal at 5 to verify the PIN. After verifying the PIN, the provisioning server sends the requested identity data to the network-enabled device at 6. Before sending the identity data, however, the appropriate encryption is applied. Depending on the circumstances, the encryption may be applied to identity data as follows:
1) If only a global key is available, the provisioning server encrypts the identity data with the global public key.
2) If a DH public key was provided to the provisioning server by the device, the provisioning server creates a symmetric key based on the DH exchange and applies another layer of encryption to the identity data using the symmetric key.
3) If an REK was provided to the provisioning server by the device, the provisioning server uses the REK to encrypt the identity data. Alternatively, both a global key and the REK may be used to encrypt the identity data.

As used in this application, the terms "component," "module," "system," "apparatus," "interface," or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a processor to implement the disclosed subject matter. The term "article of manufacture" as used herein is intended to encompass a computer program accessible from any computer-readable device, carrier, or media. For example, computer readable storage media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). A processor may be used to execute instructions encoded by the computer-readable storage media. Of course, those skilled in the art will recognize many modifications may be made to this configuration without departing from the scope or spirit of the claimed subject matter.

What has been described and illustrated herein are embodiments of the invention along with some of their variations. The terms, descriptions and figures used herein are set forth by way of illustration only and are not meant as limitations. Those skilled in the art will recognize that many variations are possible within the spirit and scope of the invention, wherein the invention is intended to be defined by the following claims—and their equivalents—in which all terms are mean in their broadest reasonable sense unless otherwise indicated.

The invention claimed is:

1. A method for providing identity data to a network-enabled device, comprising:

receiving a request for identity data from a network-enabled device that is provided to enable the network-enabled device to be authorized to operate to play videos in a network providing video content, the identity data being deployed to an end-user, the network-enabled device being pre-provisioned with a PIN and a service provider's public key from a web portal, a global key pair used by multiple network-enabled devices belonging to a particular population, a first device identifier that is user-accessible used in a key exchange for delivering the PIN, a second device identifier issued by the service provider and used by the service provider for delivering at least one service to the network-enabled device, the request for identity data including the first and second identifiers, a protected rendition of the PIN, and an encryption key or data from which an encryption key is derivable, the first and second identifiers, the protected rendition of the PIN, and the encryption key or the data from which an encryption key is derivable being signed by a private key in the global key pair;
verifying validity of the PIN included in the request to authenticate the network-enabled device to enable use of the network-enabled device in the network;
generating the identity data for the network-enabled device if the PIN is valid;
encrypting the identity data;
sending the encrypted identity data to the network-enabled device;
wherein the protected rendition of the PIN is a cryptographic hash computed over at least the combination of the PIN and second device identifier; and
wherein the protected rendition of the PIN is encrypted with the service provider's public key.

2. The method of claim 1 further comprising encrypting the identity data with a public key in the global key pair.

3. The method of claim 1 further comprising:
deriving a symmetric key from the data from which an encryption key is derivable as part of a key exchange protocol, when the symmetric key is not provided; and
encrypting the identity data with the symmetric key.

4. The method of claim 3 wherein the key exchange protocol is Deffie-Hellman (D-H).

5. The method of claim 1 wherein the PIN is pre-provisioned in the network-enabled device during a registration process between the end user and the service provider.

6. The method of claim 5 wherein the PIN is delivered to the network-enabled device over a secure network connection.

7. The method of claim 6 wherein the PIN is delivered to the service provider by a provisioning system.

8. The method of claim 7 wherein the PIN is encrypted prior to delivery by the public key in the global key pair.

9. The method of claim 5 wherein a hash of the PIN is delivered to the network-enabled device by the service provider.

10. The method of claim 9 wherein the protected rendition of the PIN included in the identity data request includes the hash of the PIN.

11. The method of claim 1 wherein the second device identifier is also pre-provisioned in the network-enabled device during the registration process.

12. A method for providing identity data to a network-enabled device, comprising:
receiving a request for identity data from a network-enabled device that is provided to enable the network-enabled device to be authorized to operate to play videos in a network providing video content, the identity data being deployed to an end-user, the network-enabled device being pre-provisioned with a PIN, a global key pair used by multiple network-enabled devices belonging to a particular population, a first device identifier that is user-accessible used in a key exchange for delivering the PIN, a second device identifier issued by a service provider and used by the service provider for delivering at least one service to the network-enabled device, the request for identity data including the first and second identifiers, a protected rendition of the PIN, and an encryption key or data from which an encryption key is derivable, the first and second identifiers, the protected rendition of the PIN, and the encryption key or the data from which an encryption key is derivable being signed by a private key in the global key pair;
verifying validity of the PIN included in the request to authenticate the network-enabled device;
generating the identity data for the network-enabled device if the PIN is valid;
encrypting the identity data; and
sending the encrypted identity data to the network-enabled device,
wherein the protected rendition of the PIN is a cryptographic hash computed over at least the combination of the PIN and second device identifier; and
wherein verifying validity of the PIN comprises computing the same hash over the PIN and the second device identifier and verifying that the hash value is the same as the hash included is in the request message.

* * * * *